(12) United States Patent
Krieger

(10) Patent No.: US 7,117,726 B1
(45) Date of Patent: Oct. 10, 2006

(54) METHOD AND APPARATUS FOR INDIRECT MEASUREMENT OF ENGINE CYLINDER PRESSURE

(75) Inventor: Roger B. Krieger, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/155,097

(22) Filed: Jun. 17, 2005

(51) Int. Cl.
*G01L 3/26* (2006.01)
*G01M 15/00* (2006.01)

(52) U.S. Cl. .................................................. 73/115
(58) Field of Classification Search ............... None
See application file for complete search history.

(56) References Cited

U.S. PATENT DOCUMENTS

| | | | | |
|---|---|---|---|---|
| 4,969,352 A | | 11/1990 | Sellnau | 73/115 |
| 5,329,809 A | | 7/1994 | Sellnau et al. | 73/115 |
| 5,367,904 A | | 11/1994 | Sellnau | 73/115 |
| 5,697,345 A | * | 12/1997 | Genter et al. | 123/470 |
| 5,712,424 A | * | 1/1998 | Reed | 73/115 |
| 6,134,947 A | * | 10/2000 | Kwun | 73/35.12 |
| 6,289,876 B1 | * | 9/2001 | Mackert | 123/470 |
| 6,427,667 B1 | * | 8/2002 | Kato | 123/470 |
| 6,684,860 B1 | * | 2/2004 | Baessler et al. | 123/470 |
| 6,769,409 B1 | * | 8/2004 | Evancik et al. | 123/470 |
| 6,840,227 B1 | * | 1/2005 | Reiter et al. | 123/470 |
| 6,845,758 B1 | * | 1/2005 | Syemour, II et al. | 123/470 |
| 6,895,939 B1 | * | 5/2005 | Gould et al. | 123/470 |
| 6,925,983 B1 | * | 8/2005 | Herden et al. | 123/297 |

* cited by examiner

*Primary Examiner*—Eric S. McCall
*Assistant Examiner*—Octavia Davis
(74) *Attorney, Agent, or Firm*—Kathryn A. Marra

(57) ABSTRACT

An apparatus for determining the pressure within the combustion chamber of an engine. The engine has a fuel injector seated within an opening of a cylinder head to inject fuel into the combustion chamber. Combustion chamber pressure acts upon the fuel injector to eject the fuel injector from the cylinder head. A clamping arrangement is provided to mount the fuel injector on the cylinder head and resist the force applied against the fuel injector by the pressure within the combustion chamber. A strain measuring transducer is associated with the clamping arrangement to measure the force that is exerted upon the clamping arrangement by the fuel injector, to thereby indirectly measure the combustion chamber pressure acting against the fuel injector.

5 Claims, 5 Drawing Sheets

METHOD AND APPARATUS FOR INDIRECT MEASUREMENT OF ENGINE CYLINDER PRESSURE

FIELD OF THE INVENTION

The present invention relates to measuring the pressure within the combustion chamber of an engine.

BACKGROUND OF THE INVENTION

It is desirable to measure the pressure within the combustion chamber of an engine. For example, such pressure can be used as an input to engine control systems, such as a fuel control system in a diesel or gasoline engine. However the combustion chamber is a very harsh environment for a pressure sensor and it would be desirable to provide a method and apparatus for the indirect measurement of the combustion chamber pressure.

SUMMARY OF THE INVENTION

An apparatus for determining the pressure within the combustion chamber of an engine. The engine has a fuel injector seated within an opening of a cylinder head to inject fuel into the combustion chamber. Combustion chamber pressure acts upon the fuel injector to eject the fuel injector from the cylinder head. A clamping arrangement is provided to mount the fuel injector on the cylinder head and resist the force applied against the fuel injector by the pressure within the combustion chamber. A strain measuring transducer is associated with the clamping arrangement to measure the force that is exerted upon the clamping arrangement by the fuel injector, to thereby indirectly measure the combustion chamber pressure acting against the fuel injector.

The present invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of the exemplary embodiment(s) is merely exemplary in nature and is in no way intended to limit the invention, its application, or uses.

Figure 1:
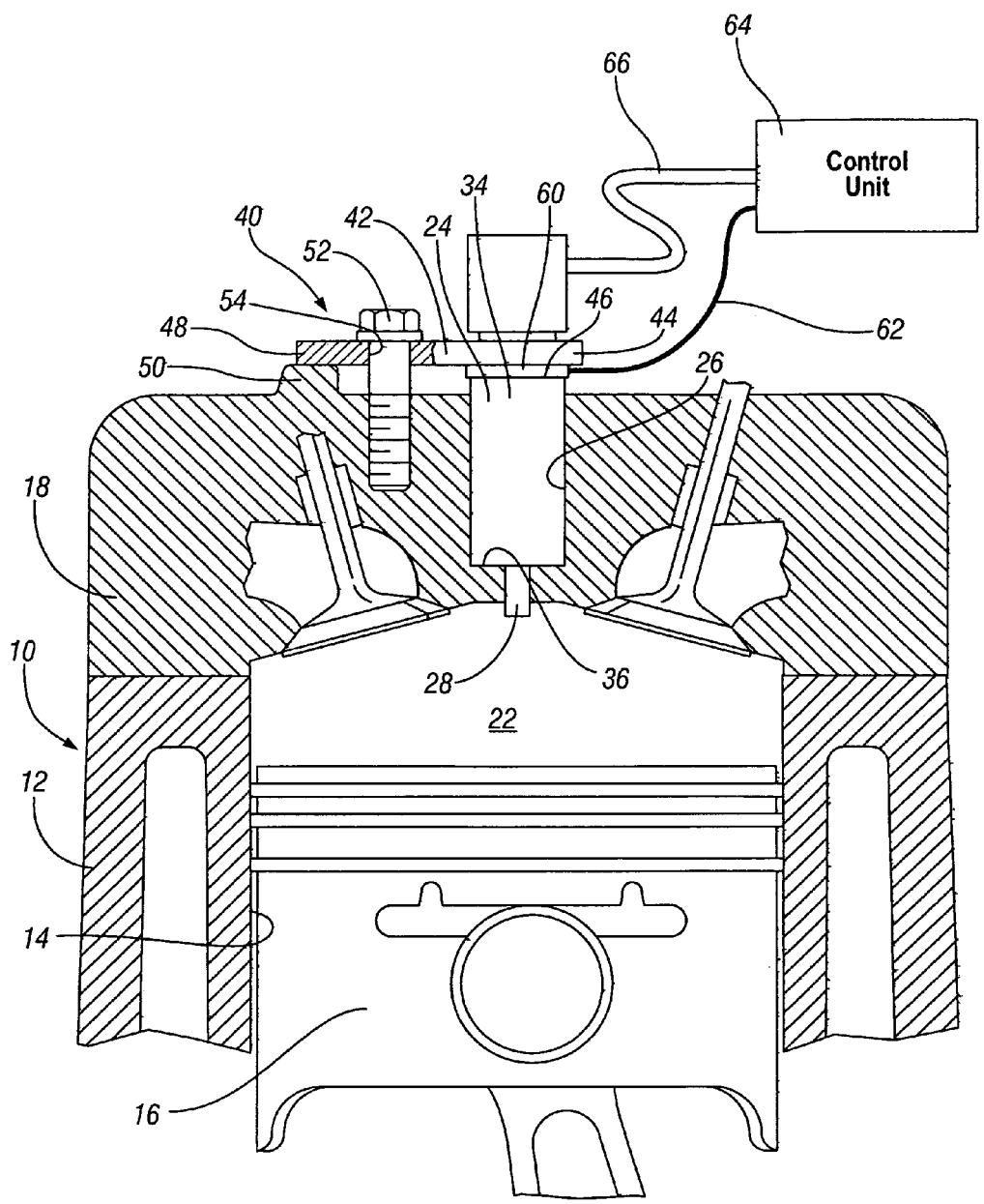
FIG. 1 is a schematic view of a engine cylinder head and fuel injector and showing a first embodiment of the invention.

Referring to FIG. 1, it is seen that an engine 10 is shown in schematic fashion. The engine 10 includes an engine block 12 having a bore 14 in which a piston 16 reciprocates. The bore 14 is closed at its top by a cylinder head 18 which cooperates with the engine block 12 and the piston 16 in defining a combustion chamber 22.

A fuel injector 24 is seated within a bore or opening 26 in the cylinder head 18 for injecting fuel into the combustion chamber 22. The opening 26 is a stepped bore, having a shoulder 28, upon which a corresponding shoulder 32 of the fuel injector body 34 is seated so as to establish the tip 36 of the fuel injector 24 in communication with the combustion chamber 22.

The fuel injector 24 is mounted on the cylinder head 18 and retained within the opening 26 by a clamping arrangement, generally indicated at 40. As seen in FIG. 1, the clamping arrangement 40 includes a clamp 42 having a first end 44 that bears upon a shoulder 46 of the fuel injector body 34. The second end 48 of clamp 42 bears upon a pedestal 50 that is cast in place on the cylinder head 18. A bolt 52 extends through a hole 54 between the two ends of the clamp, and is threaded into the cylinder head 18 so that the clamp 42 is held in position and in turn retains the fuel injector 24 in its installed position of FIG. 1. The fuel injector 24 may be removed for service or replacement by removing the bolt 52 and clamp 42.

It will be appreciated that during operation of the engine, the pressure within the combustion chamber 22 will act upon the fuel injector 24 with a force that acts in the direction to expel the fuel injector 24 from the cylinder head 18. The clamp assembly 40 is stressed by a force that is proportional to the pressure acting on the fuel injector 24.

As seen in FIG. 1, a transducer 60 is interposed between the first end 44 of the clamp 42 and the shoulder 46 of the fuel injector body 34. The transducer 60 is a load cell, for example a piezo electric device, and may be in the form of a washer that encircles the fuel injector 24. A lead wire or wires 62 is connected to an engine control unit 64, that is in turn connected to the fuel injector 24 by wire 66. The engine control unit 64 contains algorithms, calibration tables, and the like, for interpreting the electrical resistance of the transducer 60 to determine the pressure in the combustion chamber, and then control engine variables such as spark timing, fuel demand, etc.

Figure 2:
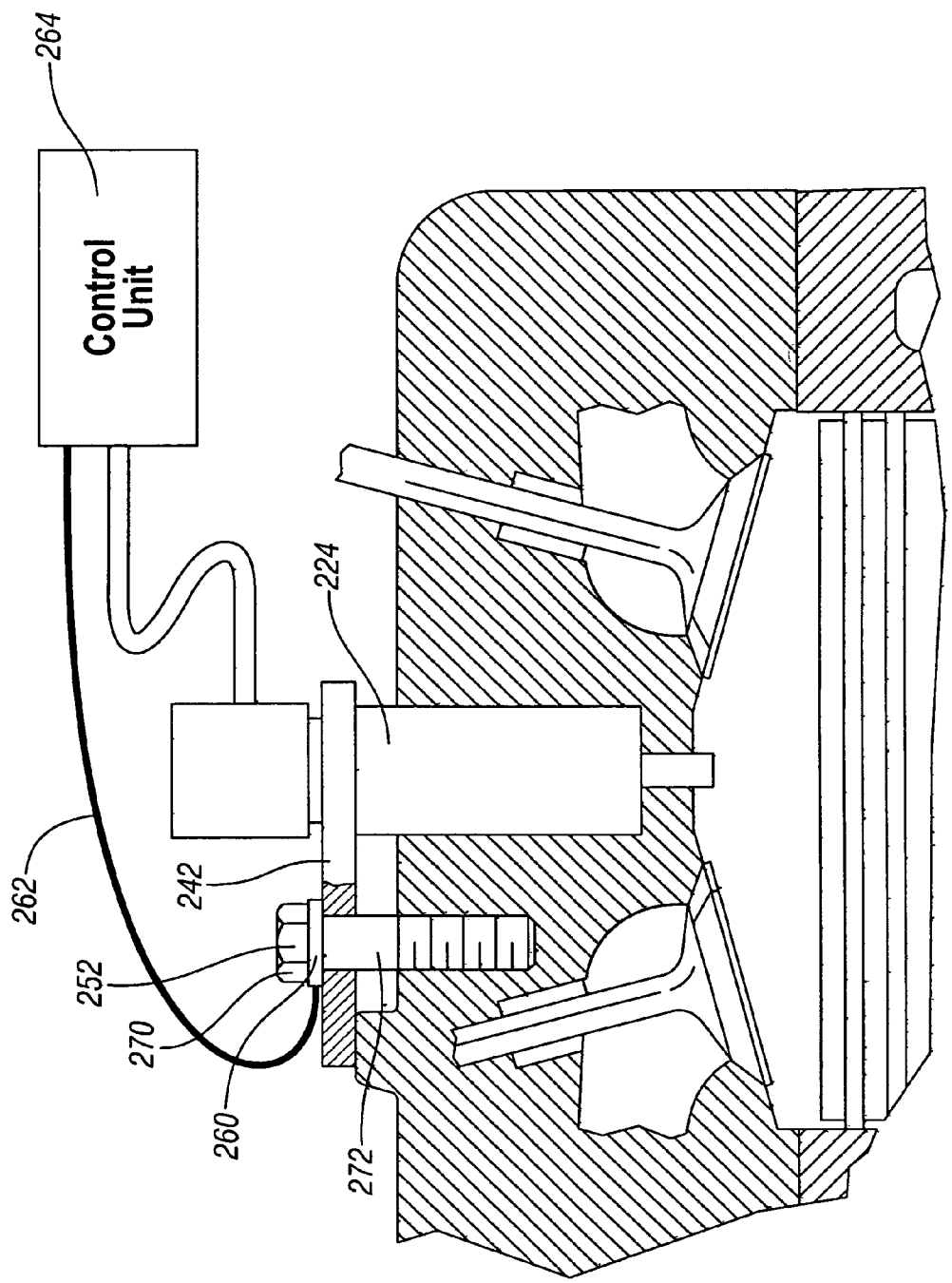
FIG. 2 is a schematic view of a engine cylinder head and fuel injector and showing a second embodiment of the invention.

FIG. 2 shows another embodiment of the invention, in which a clamp 224 is retained by a bolt 252 to retain and hold down a fuel injector 242. FIG. 2 also shows that a transducer 260 is provided between the head 270 of the bolt 252 and the clamp 224. The transducer 260 may be a load cell in the form of a washer that encircles the shank 272 of the bolt and is thereby captured between the head 270 of the bolt and the body of the clamp 242. Wire 262 extends from the transducer 260 to the control unit 264.

Figure 3:
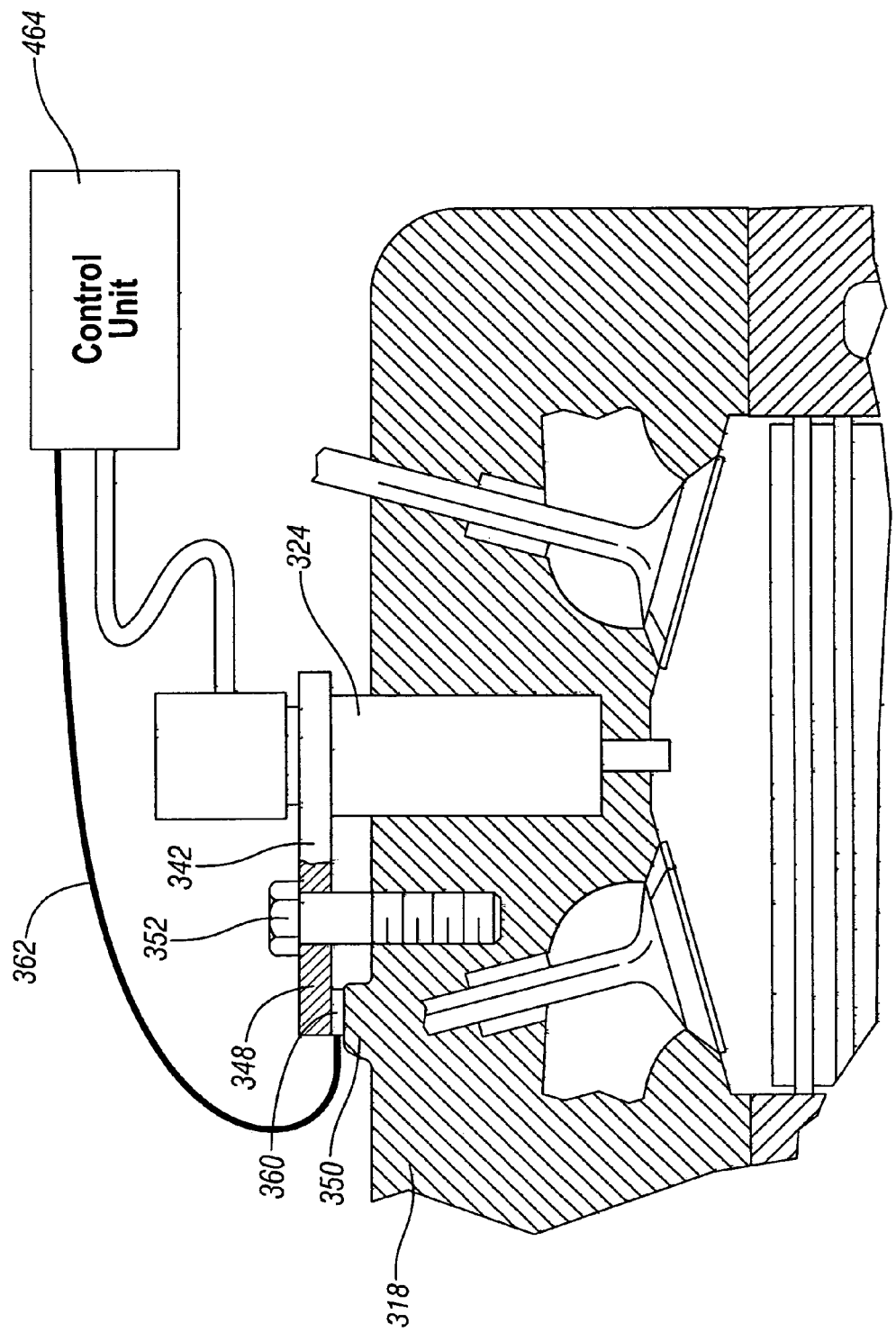
FIG. 3 is a schematic view of a engine cylinder head and fuel injector and showing a third embodiment of the invention.

FIG. 3 shows another embodiment of the invention, in which a clamp 342 is retained by a bolt 352 to retain and hold down a fuel injector 324. A transducer 360 is provided between the second end 348 of the clamp 342 and the pedestal 350 of the engine cylinder head 318. Transducer 360 may be a piezo electric or other load cell type device that experiences a change in resistance proportional to the force imposed thereon. A wire 362 extends from the transducer 360 to the control unit 364.

Figure 4:
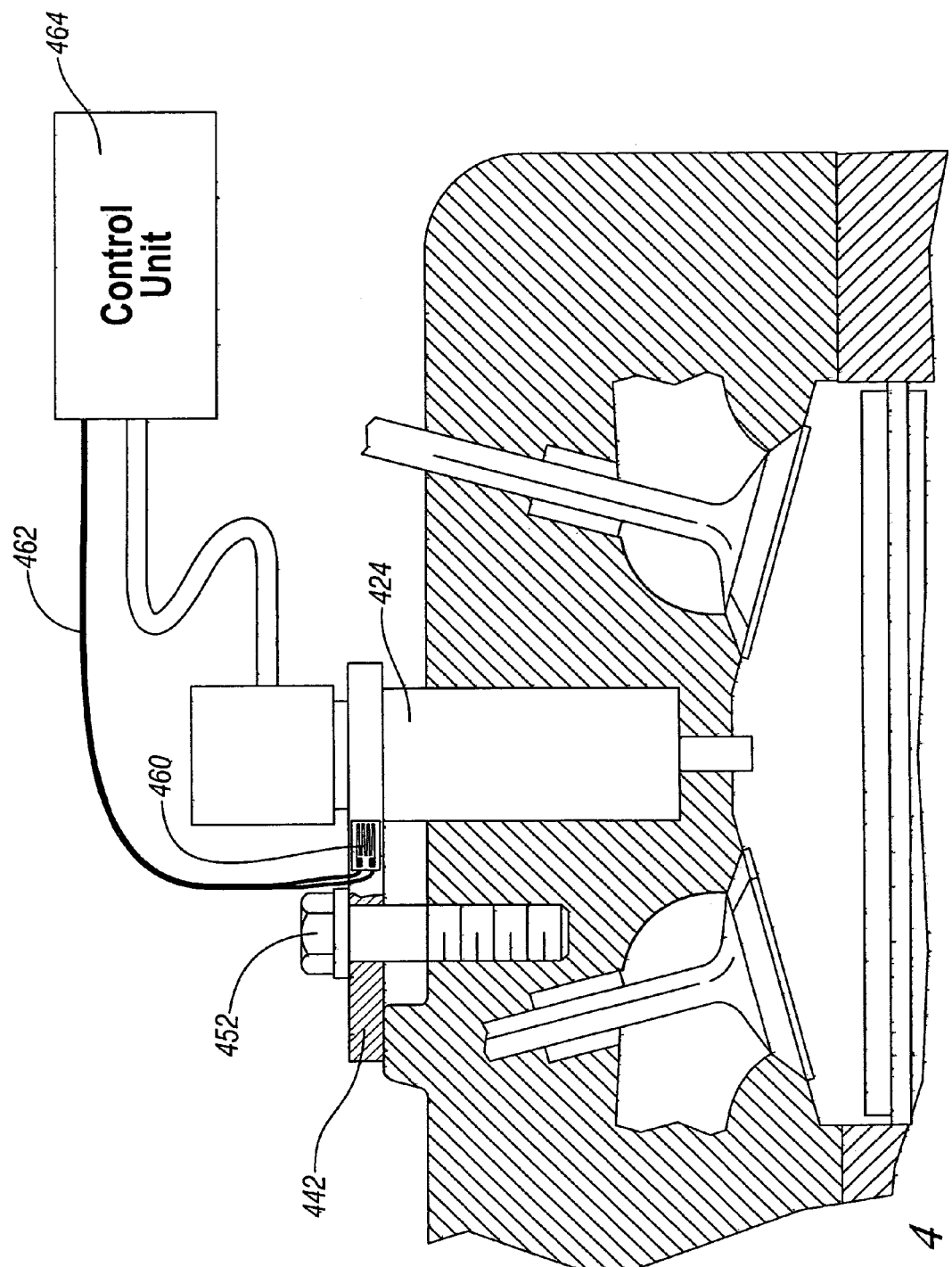
FIG. 4 is a schematic view of a engine cylinder head and fuel injector and showing a fourth embodiment of the invention.

FIG. 4 shows another embodiment of the invention, in which a clamp 442 is retained by a bolt 452 to retain and hold down a fuel injector 424. A transducer 460, in the form of a strain gage, is mounted on the body of the clamp 442. The strain gage experiences a change in resistance proportional to the strain experienced by the clamp 442 as the clamp resists the combustion chamber pressure acting on the fuel injector 424. Wire 462 extends from the transducer 460 to the control unit 464.

Figure 5:
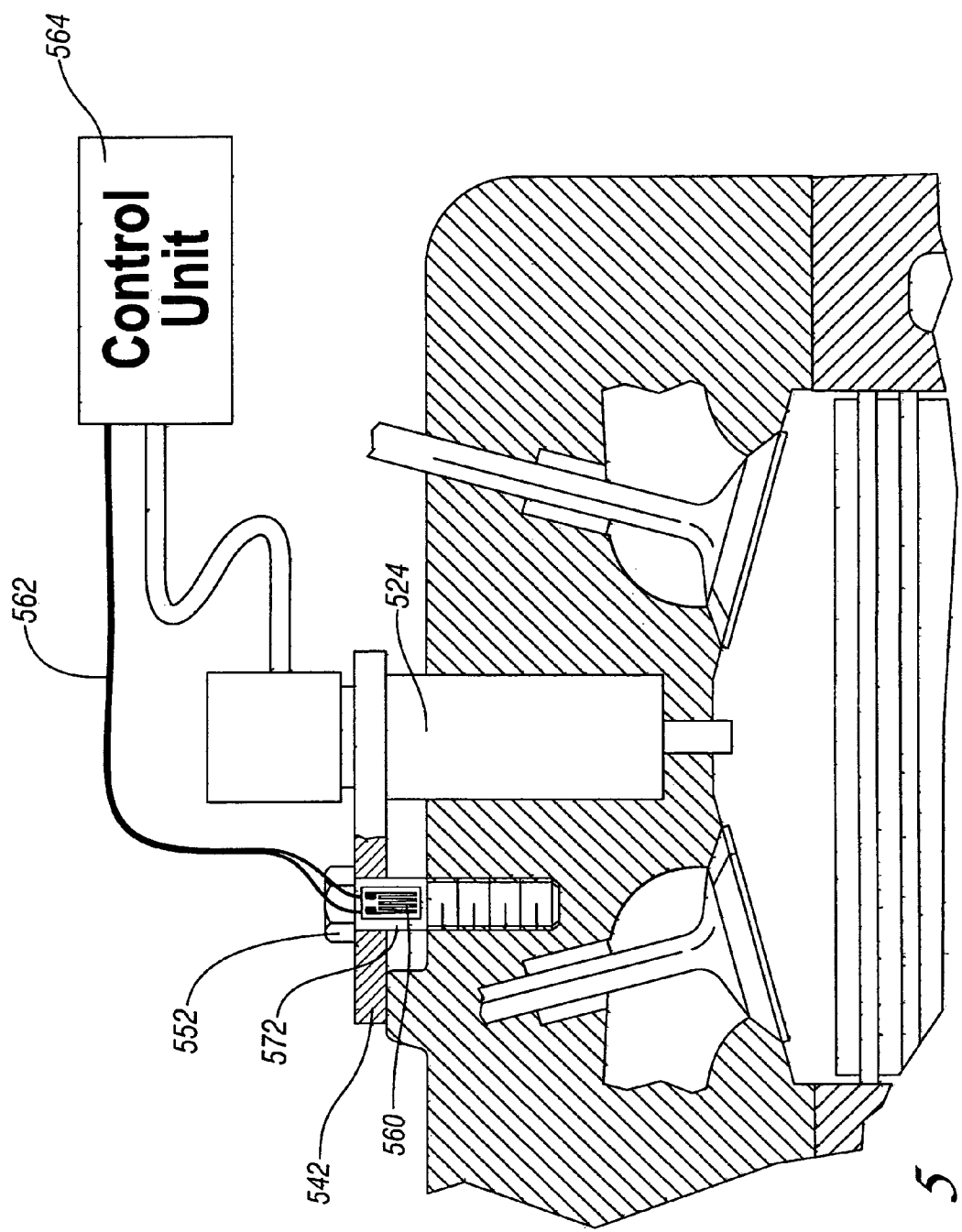
FIG. 5 is a schematic view of a engine cylinder head and fuel injector and showing a fifth embodiment of the invention

FIG. 5 shows another embodiment of the invention, in which a clamp 542 is retained by a bolt 552 to retain and hold down a fuel injector 524. A transducer 560, in the form of a strain gage, is mounted on shank 572 of the bolt 552. The strain gage experience a change in resistance that is proportional to the degree of strain experienced by the clamp 542 as the clamp resists the combustion chamber pressure acting on the fuel injector 524. Wire 562 extends from the transducer 560 to the control unit 564.

The forgoing description of the invention is merely exemplary in nature and, thus, variations within the scope of the appended claims are intended to be within the scope of the invention. For example, although the description specifically mentions transducers as being piezo electric load cell washers or strain gages, other known transducer technology may be associated with the fuel injector clamping arrangement in order to sense strain experienced by the clamping arrangement, and thereby enable the determination of the combustion cylinder pressure that is acting to push the fuel injector out of the cylinder head.

The invention claimed is:

1. Apparatus for determining the pressure within the combustion chamber of an engine, in which the engine has a fuel injector seated within an opening of a cylinder head to inject fuel into the combustion chamber, comprising:

a clamping arrangement mounting the fuel injector on the cylinder head and resisting the force applied against the fuel injector by the pressure within the combustion chamber, said clamping arrangement including a clamp lever having a first end bearing on the fuel injector, a second end bearing on the cylinder head, and a bolt threaded into the cylinder head intermediate the first and second end of the clamp lever and acting to hold down the fuel injector against the pressure;

and a strain measuring transducer mounted in direct engagement with the clamp lever to sense the force that is exerted upon the clamping lever by the fuel injector and thereby indirectly determine the combustion chamber pressure.

2. The apparatus of claim 1 in which the transducer is a load cell interposed in direct engagement between the first end of the clamp lever and the fuel injector.

3. The apparatus of claim 1 in which the transducer is a load cell interposed in direct engagement between the second end of the clamp lever and the cylinder head.

4. The apparatus of claim 1 in which the transducer is a strain gage mounted directly on the clamp lever intermediate the first and second ends thereof.

5. The apparatus of claim 1 in which the bolt has a head and a shank and the transducer is a load cell washer which is seated on the bolt shank and interposed between the head of the bolt and the clam lever to directly engage the clamp lever.

\* \* \* \* \*